Aug. 8, 1961 L. A. FREEDMAN ET AL 2,995,621

AUTOMATIC GAIN CONTROL SYSTEM

Filed March 24, 1958

INVENTORS
LARRY A. FREEDMAN &
ROLAND N. RHODES

BY [signature]
ATTORNEY

United States Patent Office 2,995,621

Patented Aug. 8, 1961

2,995,621

AUTOMATIC GAIN CONTROL SYSTEM

Larry A. Freedman, New Brunswick, N.J., and Roland N. Rhodes, Levittown, Pa., assignors to Radio Corporation of America, a corporation of Delaware Filed Mar. 24, 1958, Ser. No. 723,543
4 Claims. (Cl. 178—7.3)

Figures 1, 2:
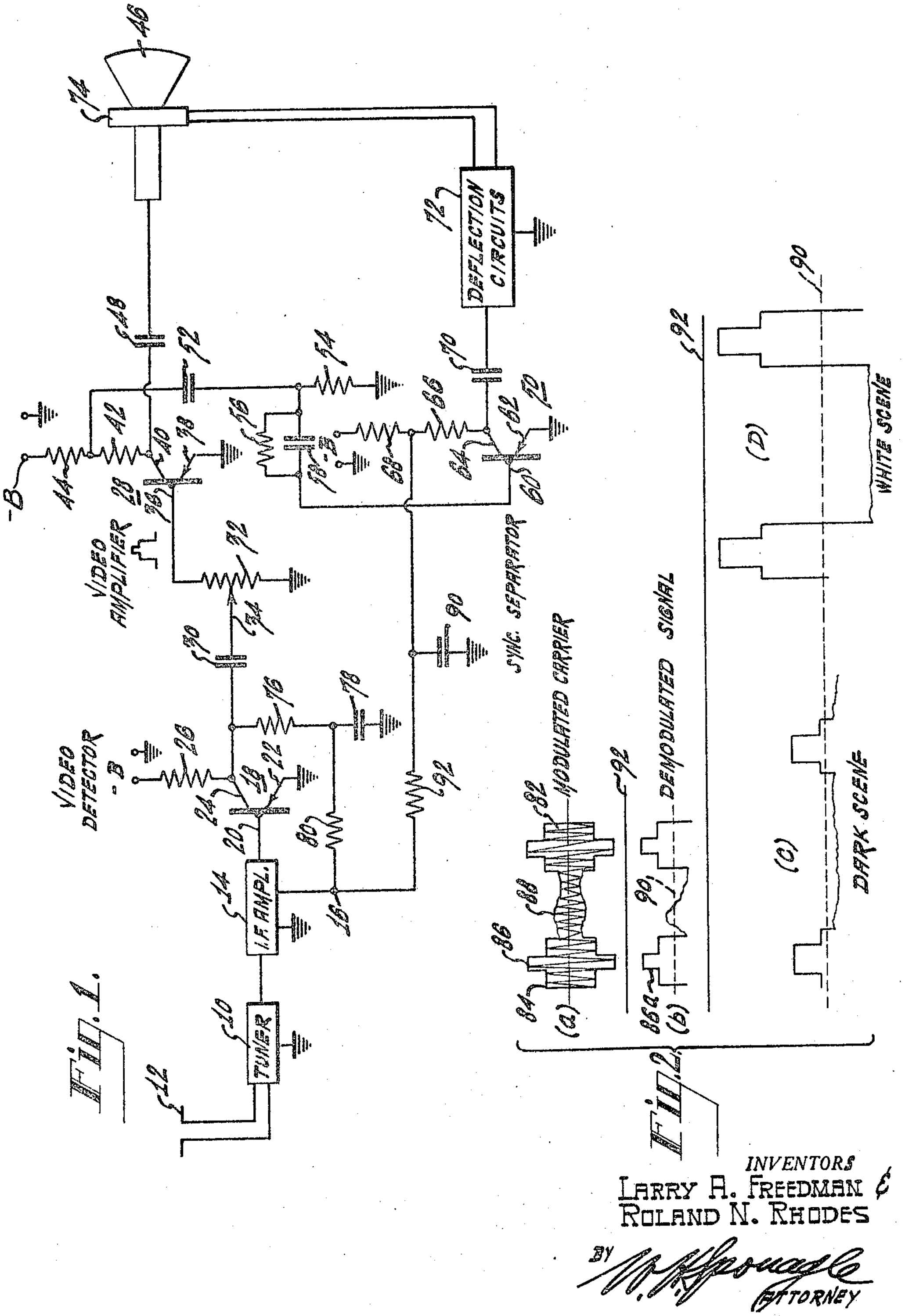

The present invention relates to improvements in automatic gain control circuits for television receivers.

It is common practice in the design and construction of television receivers to provide an automatic gain control (AGC) circuit which controls the gain of the overall receiver as an inverse function of received signal strength. By this means, receiver performance and picture quality are rendered more immune to changes in received signal strength. This automatic gain control function is generally accomplished by developing a control voltage which is a function of received signal strength. The control voltage, frequently referred to as an automatic gain control voltage, is applied to one or more amplifiers handling received television signals in a manner which acts to decrease the gain of the receiver as the received signal strength increases.

It has been proposed, as one means for developing the required automatic gain control voltage, to employ the average direct current flow through the television receiver second detector. The magnitude of the direct current flow through the second detector is, of course, a function of both the received signal intensity as well as the average brightness of the television scene to be reproduced. With such an AGC system, if the full dynamic range of the video system is used for scenes having typical black and white distribution, then predominantly white scenes will produce an AGC signal which causes overloading of the system and the AGC signal developed by predominantly black scenes will not permit maximum contrast.

To correct this, it has been proposed to subtractively combine with the AGC signal derived from the second detector current flow, a signal which represents only the average scene brightness component of the television signal. Under certain conditions, the resulting AGC signal represents only variations in the intensity, or peak-to-peak amplitude, of the received television radio carrier and is suitable for AGC purposes.

One convenient way which has been used for developing a correction signal which represents only average scene brightness in receivers employing vacuum tubes, is to utilize the potential at the control electrode of the synchronizing signal separator stage. In television receivers using a transistor synchronizing signal separator stage however, an insufficient correction signal is available at the synchronizing signal separator base electrode to materially affect the AGC voltage developed at the second detector.

Accordingly, it is an object of the present invention to provide an improved average AGC system for signal receivers employing transistors wherein effect of the modulation content of the received signal on the developed gain control signal is reduced.

It is a further object of this invention to provide an improved AGC circuit for television receivers including a transistor synchronizing signal separating stage wherein a control signal is derived as a function of the average carrier signal level, and wherein a correction voltage is derived to reduce the effects of scene brightness on the derived control signal so that predominantly white scenes will not overload the system and black scenes will provide substantially maximum contrast.

In one form of the present invention as applied to television receivers incorporating transistors, an average AGC signal is derived at the second detector stage of the receiver. This average AGC signal is applied to control the gain of the overall receiver as an inverse function of signal strength. However, changes in scene brightness have the same effect on the overall receiver gain as changes in the received signal intensity. Due to the AGC action tending to maintain the second detector output constant, the receiver gain is greater for whiter scenes than for darker scenes. Hence, for the same signal strength the amplitude of the video signal applied between the input electrodes of the synchronizing signal separator transistor changes with scene brightness causing a resultant change in the emitter-base current thereof. In transistor circuits, changes in emitter-base current produces changes in emitter-collector current flow as opposed to vacuum tubes wherein increased signal levels above that causing grid current to flow does not produce a change in plate current.

In accordance with the invention a correction signal for reducing or cancelling the effects of average scene brightness changes in the overall receiver gain is obtained from the output circuit of the synchronizing signal separator. The potential changes at the synchronizing signal separator stage due to scene brightness variations are in the same direction as the potential changes at the base electrode, and hence are of the proper polarity to counteract the changes in the overall receiver gain due to the brightness variations. Furthermore, since the variations of the transistor collector current due to changes in the amplitude of synchronizing signal pulses applied to the transistor are substantial, sufficient power is available to provide a reduction or cancellation of changes in receiver gain due to variations in scene brightness.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1 is a combination block and schematic circuit diagram representing a television receiver embodying the improved automatic gain control circuit of the invention; and FIGURE 2 is a graphical representation of certain electrical waveforms typically encountered in the practice of the present invention.

Referring now to the drawings and particularly to FIGURE 1, a conventional television tuner 10 which incorporates local oscillator and mixer circuits as well as frequency responsive signal selection circuits, is operatively connected with a receiving antenna 12. Output signals from the television tuner 10 are conventionally applied to an intermediate frequency amplifier 14 comprising one or more amplifying stages. The intermediate frequency amplifier 14 is adapted to have the gain thereof controlled in accordance with an automatic gain control (AGC) signal applied thereto by way of an AGC terminal 16. Television signals amplified by the intermediate frequency amplifier 14 are coupled to a second or video detector 18 for the television receiver which comprises a PNP type transistor having a base electrode 20, an emitter electrode 22 and a collector electrode 24. The negative terminal of an operating potential supply source, designated —B, is connected by way of a resistor 26 to the collector electrode 24 of the video detector transistor 18. The positive terminal of the operating potential supply for this and other stages of the television receiver is returned to the emitter electrode through ground.

Demodulated television signals appearing at the collector electrode 24 of the video detector 18 are applied to a video amplifier 28 by way of a coupling capacitor 30 and a variable resistor 32. By varying the position of the tap 34 along the resistor 32, the level of the video signal applied to the video amplifier may be varied, thereby providing a contrast controlling means for the receiver. The video amplifier 28 comprises a PNP type transistor having a base electrode 36, an emitter electrode 38 and a collector electrode 40. The collector electrode 40 is connected with a negative terminal of the operating potential supply means designated —B by means of a pair of resistors 42 and 44 respectively. Naturally, any suitable form of video amplifier circuit may be used which may include the usual peaking inductors and the like.

Video signals amplified by the video amplifier 28 are applied to a kinescope 46 by means of coupling capacitor 48. A portion of the video signal output appearing across the resistor 44 is applied through a double time constant network to a synchronizing signal separator (sync separator) stage 50 for the television receiver. The double time constant network comprises a capacitor 52 and a resistor 54 connected in series between the junction of the resistors 42 and 44 and ground, and the parallel combination of a resistor 56 and a capacitor 58 which are connected between the junction of the elements 52 and 54 and the input electrode of the sync separator stage 50. The purpose of the double time constant network is to develop sufficient bias so that sync separator transistor will be maintained cutoff except for signals having an amplitude corresponding to that of the synchronizing pulse components of the composite video television signal.

The sync separator stage 50 includes a transistor having a base electrode 60, an emitter electrode 62 and a collector electrode 64. The collector electrode 64 is connected through a pair of resistors 66 and 68 to the negative terminal of the operating potential supply means —B. Separated synchronizing pulses which appear at the collector electrode 64 are coupled through a capacitor 70 to the deflection control circuits 72 which include a sync clipper stage and the usual integrating and differentiating circuits for separating the vertical and horizontal synchronizing pulses, and circuits for utilizing these pulses to develop the vertical and horizontal deflection signals. These deflection signals are applied to a yoke 74 to produce the desired scanning of the cathode ray beam on the screen of the kinescope 46.

To maintain the level of the signals which are applied to the video detector 18 substantially immune to changes in the strength of the received signals, an average AGC signal is derived from the collector electrode 24 of the video detector 18 as a function of emitter 22 to collector 24 current. This signal is coupled through a resistance-capacitance filter network comprising a resistor 76 and a capacitor 78, and further through an isolating resistor 80 to the gain control terminal 16 of the intermediate frequency amplifier 14.

The I.F. amplifier 14 is designed so that a more positive voltage tends to cause a decrease in the gain thereof with a consequent increase in the level of the signal supplied to the video detector 18. By the same token, a more negative voltage applied to the AGC terminal 16 tends to increase the gain of the I.F. amplifier 14.

The character of the signal applied to the video detector 18 is, by way of example, illustrated in FIGURE 2*a*. FIGURE 2*a* shows a carrier signal 82 amplitude modulated by a composite television signal. This signal comprises a blanking component 84, a synchronizing component 86 and a video component 88. In the particular arrangement shown, the signal at the output of the video detector 18 will be substantially of the form shown in FIGURE 2*b*. That is, the demodulated synchronizing component 86*a* will actually extend in a positive going direction. The dotted line 90 illustrates the A.-C. axis of the television signal and depicts the average D.-C. value of the potential at the collector 24 of the video detector 18 relative to ground as represented by the line 92. Within certain limits the AGC loop tends to maintain the average potential at collector 24 substantially constant. Thus the AGC loop causes the I.F. amplifier 14 to have greater gain for weak signals than for strong signals. However, the average potential at the collector 24 is also a function of the average scene brightness, with a dark scene tending to cause greater collector 24 current flow, and a white scene tending to cause less collector 24 current flow. A demodulated television signal representing a darker picture is shown in FIGURE 2*c*. Contrariwise, should the received picture information correspond to a whiter scene, the waveform in FIGURE 2*d* is representative. Since a white scene tends to decrease collector 24 current flow, the action of the AGC loop causes increased I.F. amplifier 14 gain to maintain the D.C. voltage at the collector 24 substantially constant. The reverse is true of a darker scene which has the same effect as a stronger signal in that the gain of the I.F. amplifier is reduced. It, therefore, appears that the potential at the AGC terminal 16, which is a filtered version of the potential at the collector 24, does not by itself constitute a desirable automatic gain control voltage. This is because either changes in signal strength or in scene brightness will produce a change in the gain of the television receiver intermediate frequency amplifier 14.

In accordance with the present invention, this undesirable change in receiver gain as a result of an increase or decrease in scene brightness is reduced by the application to the AGC terminal 16 of a potential appearing at the junction between the resistors 66 and 68 in the sync separator 50 output circuit through a filter network comprising a shunt capacitor 90 and a series resistor 92. In considering the operation of this circuit, it will be noted that the potential appearing between the junction of the resistors 66 and 68 and ground is a function of the sync separator collector 64 current flow. The circuit parameters including the operating potential supply are selected so that the sync separator stage 50 is not driven into saturation by the synchronizing pulses so that the collector 64 current flow is a function of the peak amplitude of the synchronizing pulses applied to the base electrode 60. As the video signal level applied to the base electrode 60 is increased, the base electrode conducts more current, and becomes more positive with respect to ground. Greater base current permits greater collector current, and accordingly, the junction between the resistors 66 and 68 becomes more positive with respect to ground. Thus the potential changes in the base circuit are in the same direction as the potential changes in the collector circuit.

For white scenes, the video detector 18 develops an AGC potential which increases the gain of the I.F. amplifier 14. This produces a higher level detected signal which is amplified by the video amplifier 28 and applied to the sync separator 50. The larger amplitude synchronizing pulses cause greater collector current flow in the sync separator stage transistor thereby driving the junction between the resistors 66 and 68 more positive. This more positive potential is applied by way of a filter comprising the resistor 92 and capacitor 90 to the gain control terminal 16. By proper design of the various circuit components in accordance with well known principles, the amount that the junction between the resistors 66 and 68 becomes more positive is designed to counteract the changes in I.F. amplifier 14 gain due to the change in brightness of the received scene.

By the same token, a dark scene causes the video detector 18 to develop an AGC voltage which reduces the gain of the I.F. amplifier 14. This causes reduced amplification of the television signal and consequently the synchronizing signal components associated with the video signal applied to the sync separator 50 are reduced in amplitude. This produces less collector current flow through the resistors 66 and 68, and therefore the junction between these resistors is driven more negative. The degree to which the junction between the resistors 66 and 68 becomes more negative as a result of the dark scene is designed to counteract the change in gain of the I.F. amplifier 14 caused as a result of the dark scene. The net effect is to provide an automatic gain control circuit in which the effects of scene brightness on the resultant AGC potential is reduced.

Preferably the receiver is designed so that the effects of scene brightness changes are balanced out when the tap 34 on the contrast controlling resistor 32 is set to its uppermost position to provide maximum contrast control setting. At reduced contrast control settings, the AGC correction circuit from the sync separator 50 has corerspondingly reduced effect since the collector voltage versus change in modulation is reduced. However, in such case, the overall video signal channel has a greater tolerance to change in video signal level because of the reduced contrast control setting.

Although the transistors used in the video detector, video amplifier and sync separator stage have been shown and described as being of the PNP type, other types of transistors such as NPN transistors may be used without departing from the scope of the invention.

What is claimed is:

1. A television receiver including in combination a variable gain amplifier for selecting and amplifying a carrier wave modulated by a video signal, which signal varies in amplitude with the black content of the picture being transmitted, a detector circuit coupled to said amplifier for demoudulating the carrier wave, said detector circuit including rectifying means and a load impedance element across which the video signal is developed with an average direct current value which changes with the black content of the video signal, a signal translating stage including a transistor having a base, emitter and collector electrodes, means providing an output circuit connected between said emitter and said collector, phase inverting circuit means coupling said load impedance element to said base electrode for applying the video signal thereto, said phase inverting means including at least one transistor and including a series condenser connected to said base electrode for applying thereto the video signal, said video signal appearing on said collector electrode having an average direct current value which changes with the black content of the video signal inversely with respect to the changes in the video signal appearing across said load impedance element, resistance means connected between said load impedance and said collector electrode, means including a circuit connected to said resistance means for deriving a part of the direct current component of the video signal across said load impedance element and a part of the direct current component of the signal at said collector electrode whereby changes in the derived parts of the direct current component of the video signal with changes of the black content thereof tend to balance out, said last named circuit including a condenser connected to a point of reference potential and across which a direct current gain control voltage is developed, and means for applying said gain control voltage to said variable gain amplifier to control the gain thereof.

2. In a television receiver, an average automatic gain control system comprising the combination of a video detector including rectifying means and a load impedance element across which a direct current signal which varies with received signal intensity and scene brightness is developed, a variable gain intermediate frequency amplifier connected to apply a signal modulated carrier wave to said video detector, means for applying the direct current component of the signal developed across said load impedance element to control the gain of said intermediate frequency amplifier whereby the gain of said amplifier is varied as a function of received signal intensity as well as changes in the scene brightness component of a received television signal, synchronizing signal separator stage comprising a transistor having an input electrode, a common electrode and an output electrode, a resistive output circuit connected with said output electrode across which a direct current component is developed, means for coupling said input electrode to said load impedance element in a manner that video signals applied to the input electrode of said synchronizing signal separator cause the direct current component across said resistive output circuit to vary in response to scene brightness changes in a direction opposite to that of the variations across said load impedance element, and means coupling said resistive output circuit to said intermediate frequency amplifier to reduce variations in gain of said amplifier produced by scene brightness variations.

3. A television receiver including in combination a variable gain amplifier for selecting and amplifying a carrier wave modulated by a video signal, which signal varies in amplitude with the black content of the picture being transmitted, a detector circuit coupled to said amplifier for demodulating the carrier wave, said detector circuit including rectifying means and a load impedance element across which the video signal is developed with an average direct current value which changes with the black content of the video signal, a synchronizing signal separator stage having a transistor including a base, emitter and collector electrodes, means providing a resistive output circuit connected between said emitter and said collector, video amplifier circuit means coupling said load impedance element to said base electrode for applying the video signal thereto, said video amplifier circuit means including at least one amplifying device and a series condenser connected to invert the phase of said video signals applied to said base electrode, biasing means connected between said emitter and base electrodes to maintain said emitter-base current path substantially nonconductive for video signals below a predetermined amplitude level whereby said video signal appearing on said collector electrode has an average direct current value which changes with the level of the video signal inversely with respect to the changes in the video signal appearing across said load impedance element, resistance means connected between said load impedance and said resistive output circuit for deriving a part of the direct current component of the video signal across said load impedance element and a part of the direct current component of the signal across said resistive output circuit whereby changes in the derived parts of the direct current components due to the black content of the video signal tend to balance out, said last named circuit including a condenser connected to a point of reference potential and across which a direct current gain control voltage is developed, and means for applying said gain control voltage to said variable gain amplifier to control the gain thereof.

4. A television receiver average automatic gain control system comprising the combination of a variable gain amplifier, a video detector including rectifying means and a load impedance element connected to receive signals from said variable gain amplifier, means for applying the direct current component of the signal developed across said load impedance means to control the gain of said variable gain amplifier as an inverse function of signal strength, said direct current component being subject to variations as a result of changes in the scene brightness component of a received television signal, a synchronizing signal separator stage comprising a transistor having an input electrode, a common electrode and an output electrode, a resistive output circuit connected with said output electrode, means for coupling said input electrode to said load impedance elements in a manner that video signals applied to the input electrode of said synchronizing signal separator cause the direct current component across said resistive output circuit to vary in a direction opposite to that of the variations across said load impedance element due to scene brightness changes, and means coupling said resistive output circuit to said intermediate frequency amplifier to reduce variations in gain of said amplifier as a result of scene brightness variations.

References Cited in the file of this patent

UNITED STATES PATENTS

| | | |
|---|---|---|
| Re. 24,336 | Fyler | July 16, 1957 |
| 2,292,765 | Malling | Aug. 11, 1942 |
| 2,885,472 | Billin | May 5, 1959 |